United States Patent [19]
Gatteschi

[11] Patent Number: 5,411,223
[45] Date of Patent: May 2, 1995

[54] DEVICE FOR JOINING FILMS OF HEAT-SHRINKABLE PLASTIC MATERIAL IN A MACHINE USING SAID FILM

[75] Inventor: Emanuele Gatteschi, Parma, Italy

[73] Assignee: OCME S.r.l., Parma, Italy

[21] Appl. No.: 149,202

[22] Filed: Nov. 9, 1993

[30] Foreign Application Priority Data

Nov. 11, 1992 [IT] Italy ............. MI9200978 U

[51] Int. Cl.$^6$ ............................................. B65H 19/18
[52] U.S. Cl. ................................... 242/551; 242/552; 242/554.1; 242/554.2; 242/554.5; 242/556
[58] Field of Search ............ 242/551, 552, 554, 554.1, 242/554.2, 554, 5, 556; 226/118; 156/502, 504, 507, 510

[56] References Cited

U.S. PATENT DOCUMENTS

| | | | |
|---|---|---|---|
| 3,266,968 | 8/1966 | Gunten. | |
| 3,891,158 | 6/1975 | Shearon et al. | 242/58.1 |
| 4,047,359 | 9/1977 | Gronebaum | 53/64 |
| 4,157,934 | 6/1979 | Ryan et al. | |
| 4,190,483 | 2/1980 | Ryan et al. | |
| 4,219,378 | 8/1980 | Marschke. | |
| 4,390,384 | 6/1983 | Turner | 156/221 |
| 4,481,053 | 11/1984 | Tokuno et al. | 156/157 |
| 4,519,858 | 5/1985 | Martin | 156/64 |
| 4,540,459 | 9/1985 | Stewart et al. | 156/504 |
| 4,645,554 | 2/1987 | Wyser | 156/159 |
| 4,722,489 | 2/1988 | Wommer | 242/58.4 |
| 4,744,845 | 5/1988 | Posey | 156/159 |
| 5,050,812 | 9/1991 | Mueller | 242/58.1 |
| 5,131,593 | 7/1992 | Siegfried et al. | 242/58.1 |
| 5,273,228 | 12/1993 | Yoshida et al. | 242/58.1 |

FOREIGN PATENT DOCUMENTS

| | | |
|---|---|---|
| 2311727 | 9/1974 | Germany. |
| 3340279 | 5/1985 | Germany. |
| 3726139 | 2/1989 | Germany. |

OTHER PUBLICATIONS

Patent Abstracts of Japan, vol. 6, No. 256, Dec. 1982.
Patent Abstracts of Japan, vol. 13, No. 455, Oct. 13, 1989.
Patent Abstracts of Japan, vol. 12, No. 336, Sep. 1988.

*Primary Examiner*—John P. Darling
*Attorney, Agent, or Firm*—Hedman, Gibson & Costigan

[57] ABSTRACT

In order to make it possible the bobbin (11A) of heat-shrinkable plastic material film to be replaced without stopping the machine which uses it, the device (1) substantially comprises, listed in the direction of film (A-B) unwinding, one pair of parallel reels (2A, 2B), respectively supporting the bobbins (11A, 11B) on which the film (A-B) is wound, two sucking mouths (3A, 3B), two cutting devices (4A, 4B), a welding device (6) and an accumulation device (7).

3 Claims, 4 Drawing Sheets

DEVICE FOR JOINING FILMS OF HEAT-SHRINKABLE PLASTIC MATERIAL IN A MACHINE USING SAID FILM

The present invention relates to a device for joining heat-shrinkable film in a machine using said film.

In the presently used packaging machine, the film of heat-shrinkable plastic material is taken from a bobbin which, when is emptied, must be replaced with a full bobbin.

The replacement operation furthermore requires that the trailing end of the film which is being unwound from the empty bobbin is joined (heat-welded) to the leading end of the film coming from the full bobbin.

During the above operations, the packaging machine has to be stopped and therefore the production is penalized by a dead time which, on the contrary, should desirably be avoided.

The purpose of the present finding is of obviating the above mentioned drawback, i.e., providing a device for heat-shrinkable film joining which is capable of making it possible the empty bobbin to be replaced by a full bobbin and the film joining to be carried out without that the machine has to be stopped.

Such purposes are achieved by means of a device according to claim 1.

The finding is illustrated, for merely exemplifying, non-limitative purposes, in the figures of the accompanying drawing tables.

Figure 1:
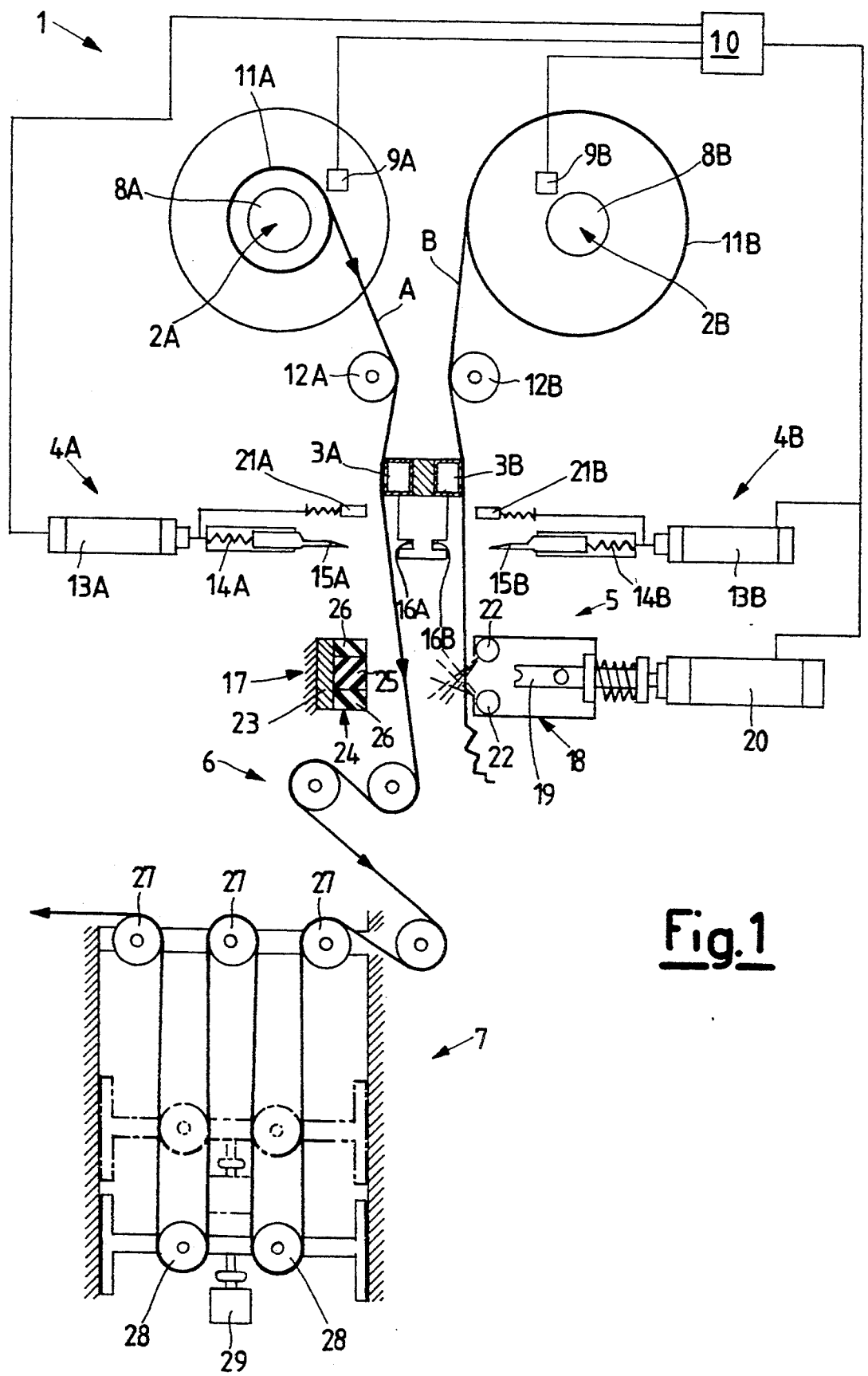
FIG. 1 is a schematic view of a device according to the present finding, during the normal film unwinding step.

Referring to the above mentioned figures, the device for film joining according to the present finding, generally indicated with (1), comprises, listed in the direction of unwinding of both films (A) and (B), a first unwinding reel (2A) and a second unwinding reel (2B), first return rollers (12A) and (12B), a first sucking mouth (3A) and a second sucking mouth (3B), and a first cutting device (4A) and a second cutting device (4B), a welding device (5), a set of second return rollers (6), and a film accumulation device (7).

The unwinding reels (2A) and (2B) are each associated with respective brakes (8A) and (8B) and sensors (9A) and (9B). The sensors (9A) and (9B) send their signals to a central control unit (10) suitable for commanding, according to a pre-established operating cycle, the operation of the device (1). By means of brakes (8A) and (8B), the unit (10) can control the unwinding speed and/or the tension both films (A) and (B) are subject to.

The reels (2A) and (2B) support bobbins (11A) and (11B), which, in the herein exemplified case, are, respectively, close to get emptied and full. The first return rollers (12A) and (12B) cooperate with the second return rollers (6) in such a way that the portions of film (A) and film (B), when unwound, result to be taut and adhering to the sucking mouths (3A) and (3B), which, however, do not operate simultaneously. The first and the second cutting devices (4A) and (4B), respectively, are identical to each other and substantially comprise actuator cylinders (13A) and (13B) acting by means of the interposition of springs (14A) and, respectively, (14B) and blades (15A), and, respectively, (15B).

At the cutting time, the blades (15A), (15B) penetrate respective seats (16A) and (16B) of a shoulder element. The cutting devices furthermore comprise pressing elements (21A), (21B) elastically acting on films (A) and (B) so as to keep them clamped in the nearby of the action line of blades (15A), (15B).

The welding device (5) comprises a stationary shoulder (17), a pressing element (18), a welder bar (19) and an actuator cylinder (20).

The pressing element (18), which has a width equal to the width of films (A) and (B) is elastically installed on the actuator cylinder (20) and bears a plurality of nozzles (22) from which cooling air is blown.

On the contrary, the welder bar, which also has a width equal to the width of films (A) and (B), is rigidly mounted on the stem of the actuator cylinder (20).

The stationary shoulder (17) is formed by a support of rigid material (23) and a layered portion (24) consisting of a plurality of mutually overlapped layers of elastically yielding material.

In order to favour the operating effectiveness of the welder bar (19), the layered portion (24) is subdivided into a central portion (25) and two mutually identical side portions (26), which are layered according to a different pattern and as a function of the fact that the side portions (26) are destined to act as shoulders for the pressing element (18) (cold), whilst the central portion is destined to act as a shoulder for the welder bar (19) (hot).

The side portions (26) comprise, listed from outside inwards, at least one layer of soft, however not necessarily heat-resistant, rubber.

The central portion (25) comprises, listed from outside inwards, a Teflon ® layer, at least one layer of heat-resistant silicone rubber and at least one soft rubber layer.

The accumulator device (7) is of the type comprising a first set of stationary rollers (27) and a second set of sliding rollers (28), which can so slide as to move away from, while remaining coplanar with, the above stationary rollers, under the action of a constant force which can be applied either by a weight (29), or a hydraulic actuator, not shown in the drawings.

The larger the distance between both roller sets, i.e., the stationary and the sliding roller sets, the larger the amount of accumulated film.

During the operation, the film (A) is fed to the user machine from the bobbin (11A) which is going to get emptied (FIG. 1). The film (A) path is between the various elements of the device, clearly visible in FIG. 1.

The bobbin (11B) is stationary, in stand-by step. The leading end of the film (B) lays freely overhanging beyond the welding device, get clamped by the depressure generated by the sucking mouth (3B).

When the sensor (9A) sends to unit (10) the signal that the bobbin (11A) is close to get emptied, the brakes (8A) and (8B) are enable in order to block films (A) and (B).

The film (A), which continues to be pulled by the packaging machine, is supplied by the accumulation device (7), thanks to rollers (28) progressively moving towards rollers (27).

Figure 2:
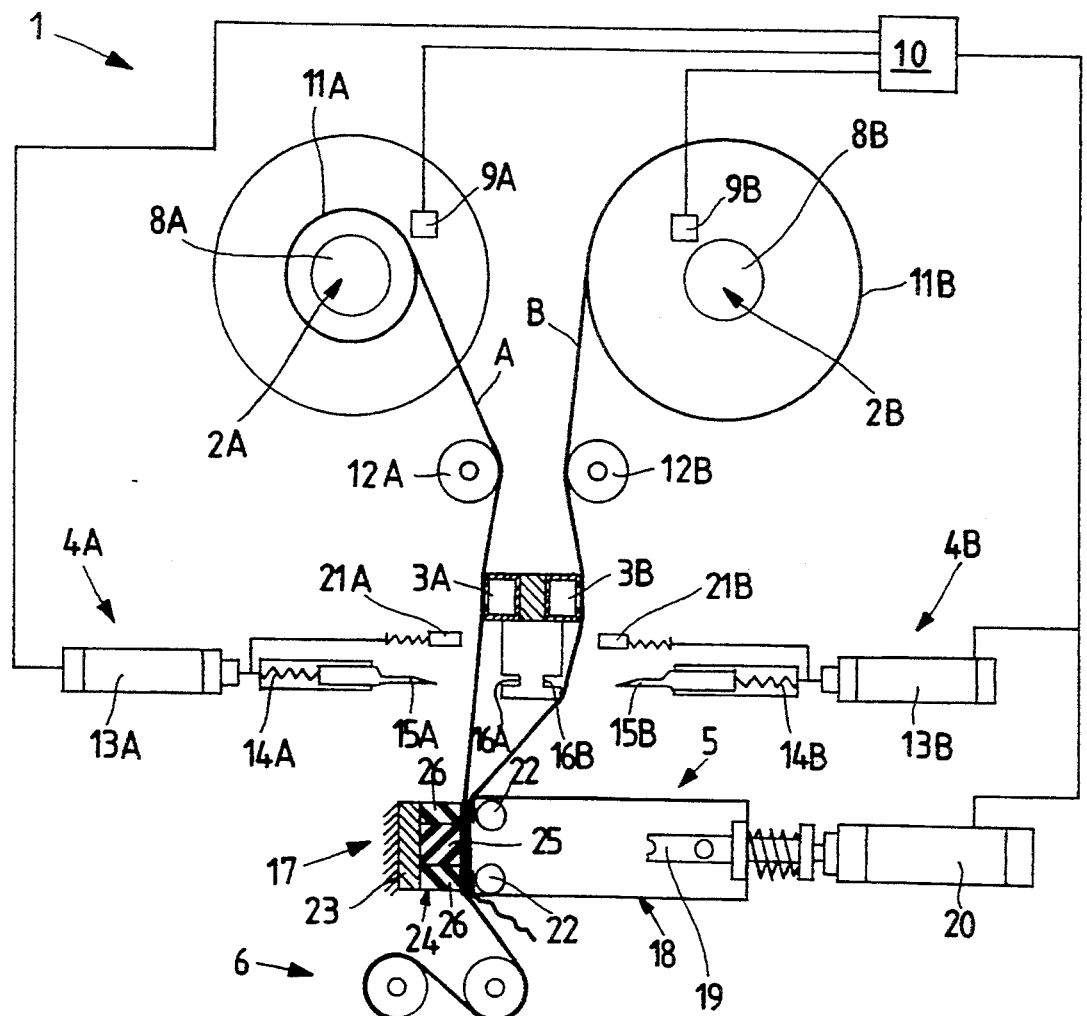
FIG. 2 is a schematic view of the device according to FIG. 1, in which the pressing element keeps the film coming from the full bobbin and the film coming from the bobbin which is going to be emptied pressed towards each other, stopping the latter immediately before the intervention of the welder bar.

The welding device (5) is enabled (FIG. 2). The pressing element (18) elastically compresses the film (B) head against the end portion of film (A). Subsequently, the welder bar presses both films (A) and (B) against each other for the necessary time, in order to weld them along at least one seaming line.

Figure 3:
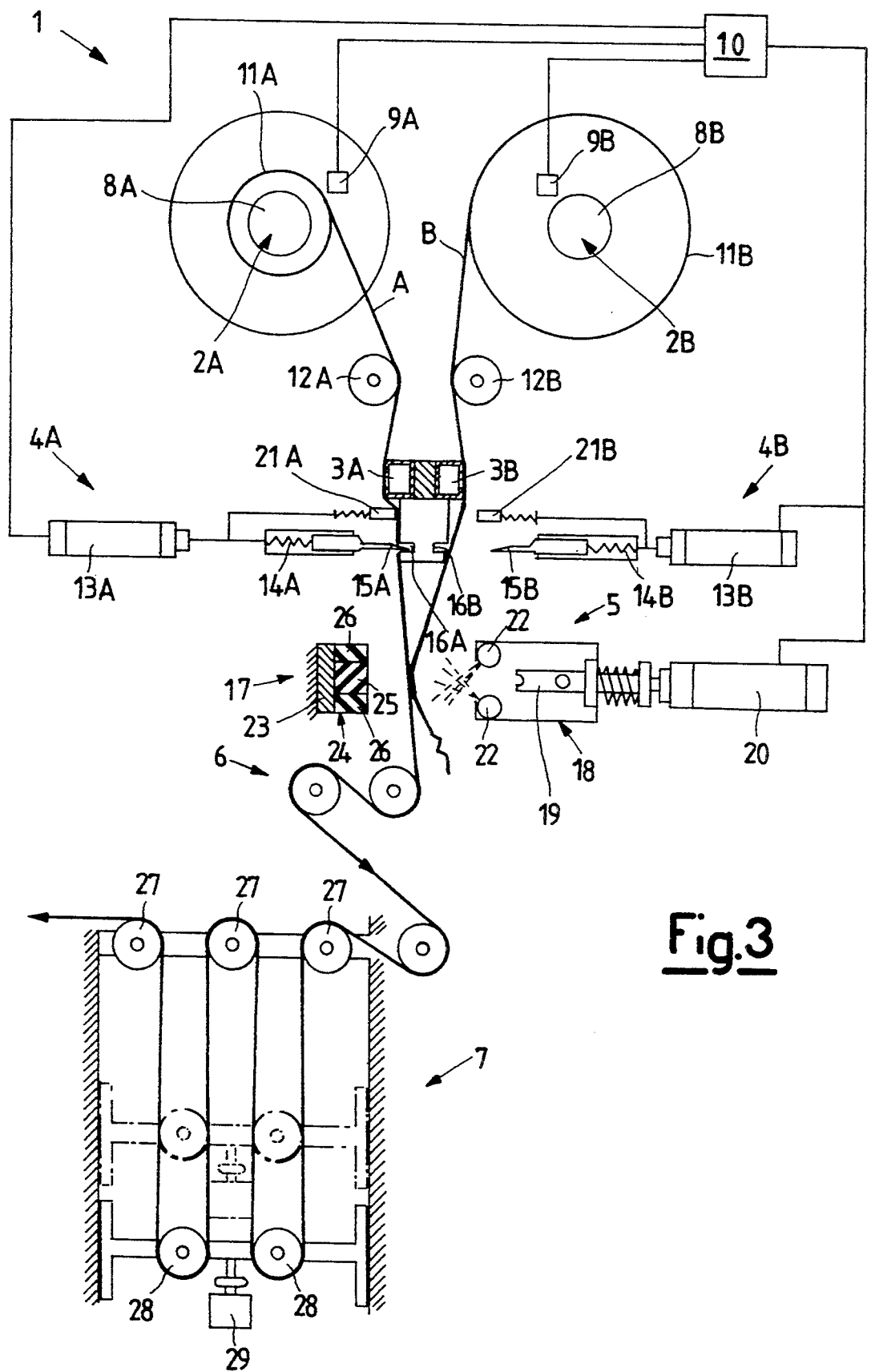
FIG. 3 is a schematic view of the device according to Fig. 1, in which the cutting device is operating on the film coming from the bobbin which is being emptied.

The cutting device (4A) is enabled, thus cutting the film (A) (FIG. 3).

The free end of the portion of film (A) still wound of bobbin (11A) is clamped by the sucking mouth (3A) enabled at the time of disabling of the sucking mouth (3B). The enabling of the cutting device (4A), of the sucking mouth (3A) and the disabling of the sucking mouth (3B) preferably take place at the same time.

When the necessary time to carry out the welding has elapsed, the welder bar (9), and consequently, also the pressing element (18), are moved backwards. Simultaneously, from nozzles (22) air is blown in order to cool the welded seam.

The pressing element (18) is moved backwards, releasing the film (B), which can start again to freely unwind from bobbin (11B).

The accumulation device (7) makes it possible the film supplied soon before the future bobbin replacement, to be recovered.

Simultaneously, the operator, possibly warned by the same machine, removes from reel (2A) the bobbin (11A) and replaces it with a full bobbin.

Figure 4:
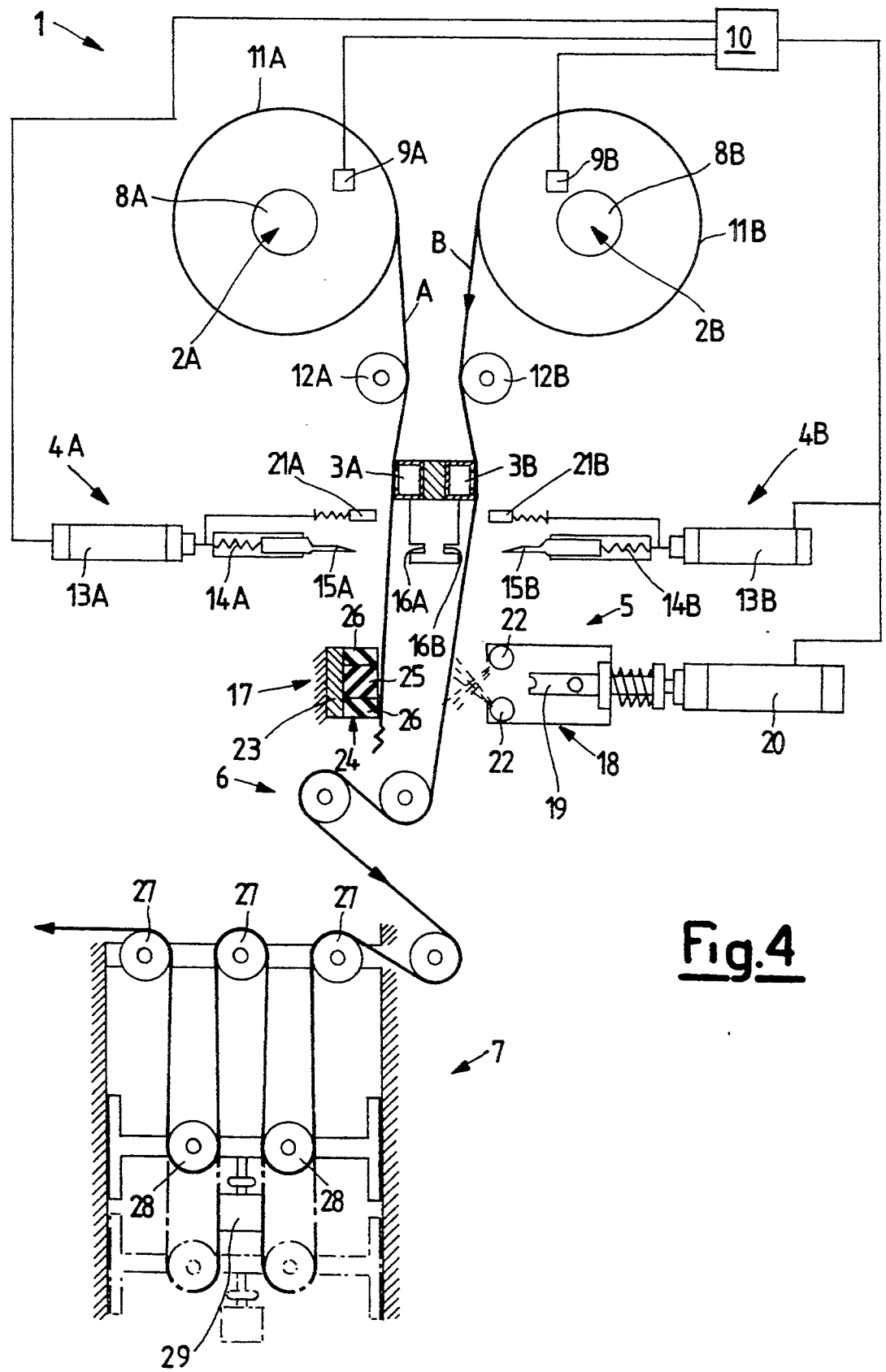
FIG. 4 is a schematic view of the device of FIG. 1, in which the device according to the present finding has ended operating and the film is being normally unwound from the replaced bobbin.

The leading end of the film wound on said full bobbin will be arranged as displayed in FIG. 4, i.e., clamped in stand-by position by the sucking mouth (3A).

The next bobbin replacement will involve the bobbin (11B), and also it, like all preceding and subsequent replacements, will be carried out without that stopping the machine necessary.

I claim:

1. Device (1) for automatically joining films (A-B) of heat-shrinkable plastic material in a machine using said film, characterized in that said device comprises directional means for unwinding film, and means listed in the direction of film unwinding comprising:

one pair of reels (2A, 2B) with parallel axes, suitable for respectively housing a first bobbin (11A) of heat shrinkable film from which said (A) is being unwound, and a second bobbin (11B) which is in stand-by step and is ready to supply film (B) as soon as the first bobbin (11A) is emptied, one pair of sucking devices (3A, 3B), acting on the whole width of films (A, B) and suitable for keeping the film (A) coming from the first bobbin (11A) and the film (B) coming from the second bobbin (11B) independently clamped by means of their sucking action;

one pair of cutting devices (4A, 4B), each of which is capable of independently acting on the respective film (A, B), a welding device (5) suitable for acting on both films (A, B) which comprises an actuator device (20), a pressing element (18), a welder bar (19) and a stationary shoulder (23), in which the actuator device (20) simultaneously acts: elastically on the pressing element (18); and rigidly on the welder bar (19) contained inside the interior of said pressing element (18), the pressing element (18) is provided with air blowing nozzles (22) for blowing air for welded joint cooling, the stationary shoulder (17) is formed by support (23) of rigid material and a layered portion (24) provided with a plurality of mutually overlapped layers of elastically yielding material.

2. Device according to claim 1, characterized in that each cutting device (4A, 4B) includes a pressing element (21A, 21B) which elastically acts on the film (A, B), to keep it in a line of action of the cutting blade (15A, 15B).

3. Device according to claim 1, characterized in that the layered portion (24) is subdivided into two side portions (26) identical to each other and a central portion (25) which comprises, listed from outside inwards, a polytetrafluoroethylene layer, at least one layer of heat resistant silicone rubber, and at least one layer of soft rubber, the side portions (26) comprise, listed from the outside inwards, at least one layer of soft rubber.

* * * * *